Figure 1:
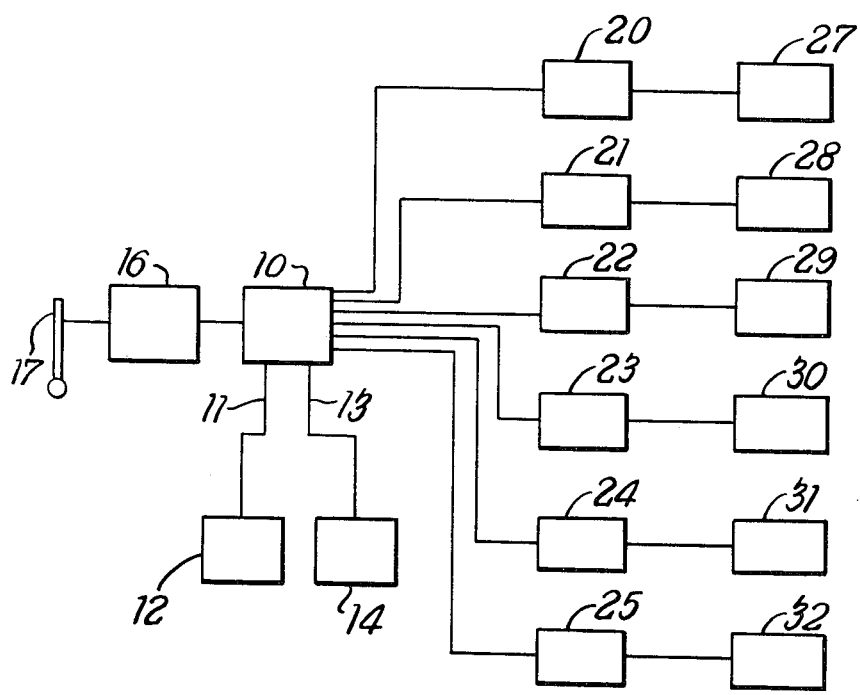

United States Patent [19]

Windsor

[11] 4,117,747
[45] Oct. 3, 1978

[54] ELECTRONIC CONTROL SYSTEM FOR AUTOMATIC GEARBOXES

[75] Inventor: Harry Mellows Windsor, Leamington Spa, England

[73] Assignee: Automotive Products Limited, England

[21] Appl. No.: 717,588

[22] Filed: Aug. 25, 1976

Related U.S. Application Data

[63] Continuation of Ser. No. 522,142, Nov. 8, 1974, abandoned.

[30] Foreign Application Priority Data

Nov. 21, 1973 [GB] United Kingdom ............... 54112/73

[51] Int. Cl.$^2$ .......................................... B60K 41/18
[52] U.S. Cl. ................................................ 74/866
[58] Field of Search ........................................ 74/866

[56] References Cited

U.S. PATENT DOCUMENTS

| | | | |
|---|---|---|---|
| 3,267,762 | 8/1966 | Reval | 74/866 X |
| 3,439,564 | 4/1969 | Scholl et al. | 74/866 |
| 3,626,254 | 12/1971 | Kawakubo | 74/866 X |
| 3,701,294 | 10/1972 | Ito et al. | 74/866 |
| 3,826,158 | 7/1974 | Flaig | 74/866 |

Primary Examiner—Samuel Scott
Assistant Examiner—Lance W. Chandler
Attorney, Agent, or Firm—Lawrence J. Winter

[57] ABSTRACT

An automatic gearbox has a planetary gear system and fluid pressure operated friction elements which are operable to act on the gear system to change the gear ratios thereof. Operation of the friction elements is controlled by electronic circuits on the basis of electrical signals indicative of vehicle speed and throttle opening. A manually operable switch is provided for selecting reverse gear and for providing manual overriding signals for the selection of forward gears. The electronic circuits are so arranged that, when a gear is selected manually, operation of the friction elements associated with the gear or gears higher than the selected gear is not carried out until vehicle speeds at least equal to the vehicle speeds at which the said friction elements are operated at full throttle opening in the automatic mode of operation. The electronic circuits have a signal generating circuit for generating a signal the magnitude of which is indicative of vehicle associated with each forward gear change provided by the gearbox.

1 Claim, 3 Drawing Figures

ELECTRONIC CONTROL SYSTEM FOR AUTOMATIC GEARBOXES

This application is a continuation of application Ser. No. 522,142 filed Nov. 8, 1974 now abandoned.

This invention relates to automatic gearboxes for vehicles. The gearboxes are of the type comprising a planetary gear system, fluid pressure operated friction elements operable to act on the gear system to change the gear ratios thereof, and electronic control circuits responsive to signals indicative of vehicle speed and throttle opening to control fluid pressure operation of the friction elements by means of solenoid valves such that a gear is engaged which is appropriate to the vehicle speed and throttle opening, the electronic control circuits also being responsive to a signal or signals produced by a manually operable switch for selecting reverse gear and for providing manual overriding signals for the selection of forward gears. Such a gearbox will hereinafter be described as a gearbox of the type referred to.

It should be understood that the term throttle opening is used to describe for example the position of the driver's accelerator pedal or equivalent manual lever and in effect it is used to communicate the requirements of the driver to the control circuits. If the accelerator is fully depressed a rapid acceleration is required and the gear changes are such that maximum use is made of the available engine power. If the accelerator is only slightly depressed the gear changes are made at lower engine speeds.

According to the present invention there is provided an automatic gearbox of the type referred to wherein the electronic control circuits are so arranged that when a gear is selected by said manually operable switch, operation of the friction elements associated with the gear or gears higher than the selected gear is not carried out until vehicle speeds at least equal to the vehicle speeds at which the said friction elements are operated at full throttle opening in the automatic mode of operation.

The electronic control circuits may be so arranged that operation of the friction elements associated with gears lower than the selected gear is carried out according to the automatic mode of operation.

The signal indicative of throttle opening may be provided by a potentiometer, the wiper of which moves in accordance with the rotation of the throttle spindle of the vehicle.

The potentiometer may be connected to a plurality of emitter followers, the number of emitter followers being equal to the number of forward gear changes provided by the gear box.

The electronic control circuits may include a plurality of signal generating circuits each arranged to generate a signal the magnitude of which is indicative of vehicle speed, the number of said signal generating circuits being equal to the number of forward gear changes provided by the gearbox, the output of each signal generating circuit being connected to the output of a respective emitter follower to provide signals indicative of the vehicle speed and the throttle opening.

Each emitter follower may be connected to the manually operable selector switch, the arrangement being such that when a gear is selected manually the emitter followers associated with the selected and higher gears are fully conducting.

The connections between each emitter follower and the selector switch may include diodes so arranged that when a gear is selected manually the emitter followers associated with the gears lower than the selected gear operate as in the automatic modes of operation.

The electronic control circuits may include delay circuits which are operative at gear change points to provide an overlap between the operation of successive friction elements. Each delay circuit may be a Miller integrator.

Each delay circuit may be operative in response to one of a plurality of switching circuits each associated with a forward gear change and each arranged to switch when the signal indicative of vehicle speed and throttle opening is at a predetermined value. Each switching circuit may have input voltage hysteresis such that the value of input voltage at which each switching circuit switches when the input voltage is increasing is greater than the value at which each circuit switches when the input voltage is decreasing.

The invention will be described now by way of example only with particular reference to the accompanying drawings.

Figure 2A:
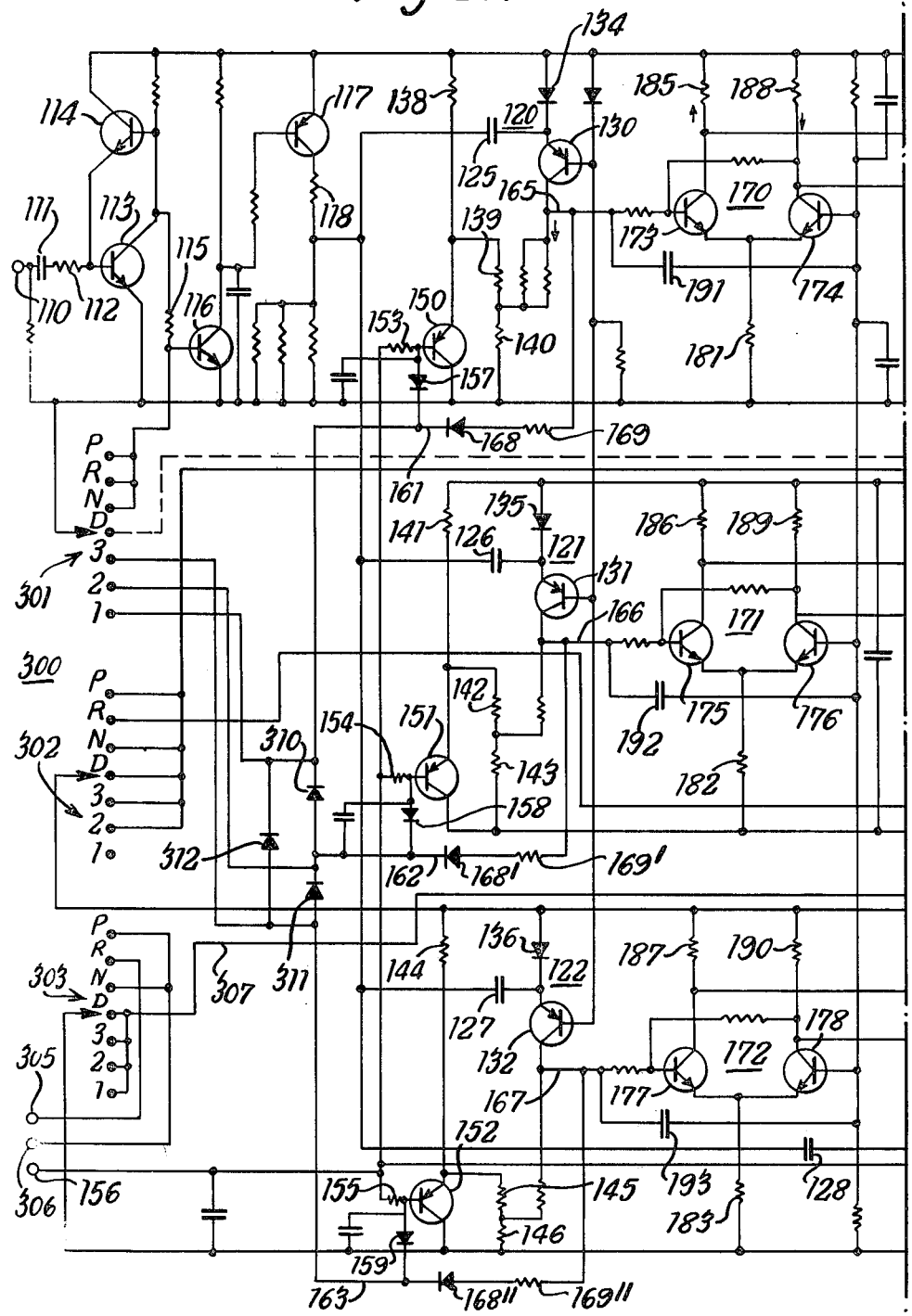
Figure 2B:
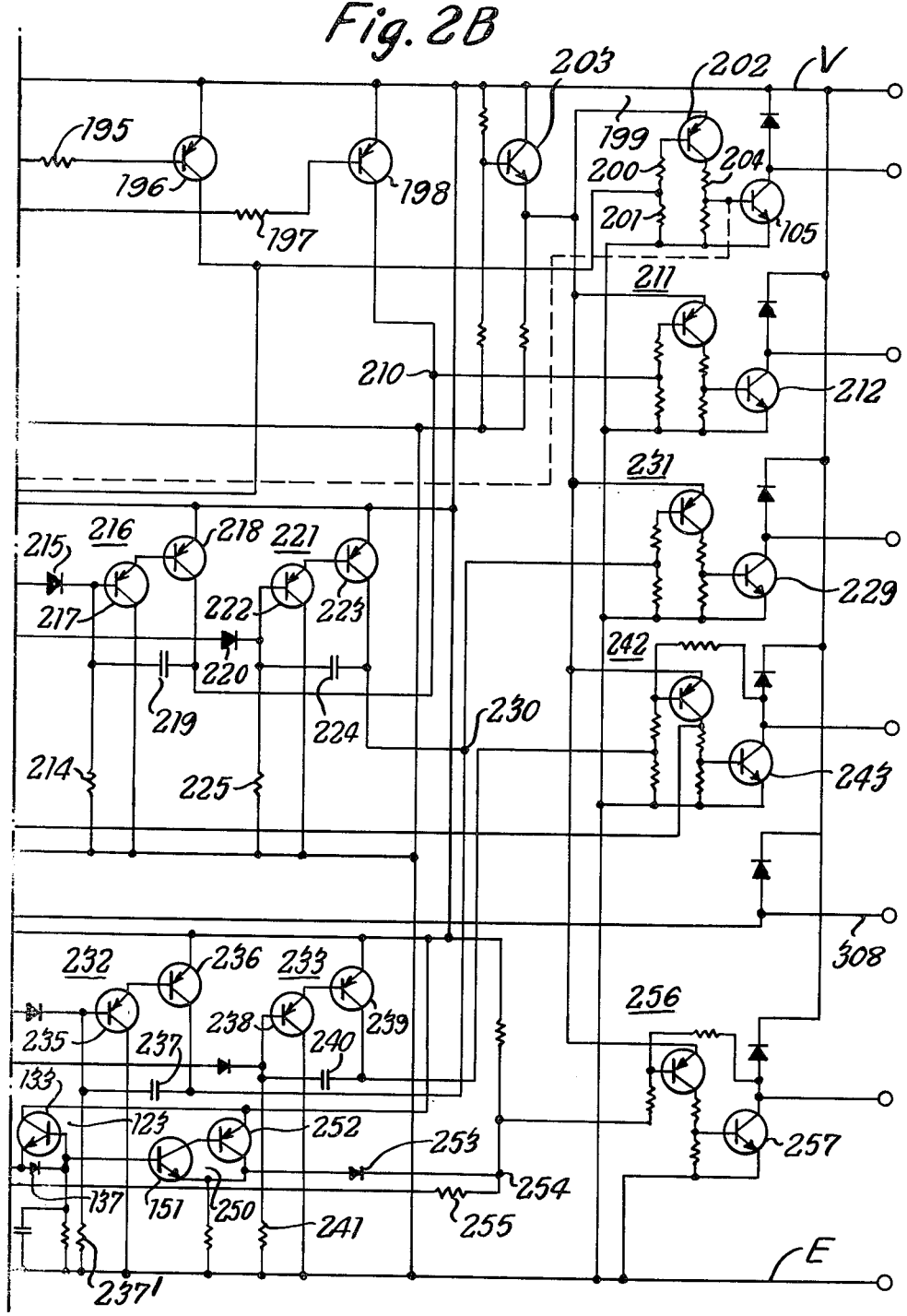

In the drawings:

FIG. 1 is a block schematic diagram of an automatic gearbox in accordance with the present invention; and FIG. 2 is a circuit diagram of an electronic control circuit used in the gearbox of FIG. 1.

An automatic gearbox has a number of friction elements which can act on a gear train to provide changes in gear ratio. The gearbox has the following friction elements: a forward clutch, a top and reverse clutch, a third gear brake band, a second gear brake band, and a reverse gear brake band. Each friction element is arranged to be operated in response to the energisation of a solenoid of an associated solenoid valve to provide the changes in gear ratio.

When the gearbox is in neutral none of these elements is engaged. When the vehicle is being driven under automatic control in first gear the forward clutch is engaged. A sprag clutch is also engaged in first gear. When second gear is selected the second brake band is engaged and the forward clutch remains engaged. In third gear the third brake band is engaged and the second brake band is released. The forward clutch remains engaged.

In top gear all brake bands are released and the top and reverse clutch is engaged. The forward clutch remains engaged.

When reverse gear is selected the reverse brake band and the top and reverse clutch are engaged. The other friction elements are not engaged.

The energisation of the solenoids is effected in response to output signals produced by electronic control circuits which receive signals indicative of the vehicle speed and the throttle opening. The arrangement is such that the electronic control circuits produce output signals to effect energisation of a solenoid or solenoids so that a gear is engaged which is appropriate to the vehicle speed and throttle openings.

A schematic block diagram of the gearbox is shown in FIG. 1. The electronic control circuits are shown at 10 and have a first input 11 connected to an inductive speed pick-up 12 which is arranged to produce an electrical signal indicative of the speed of the vehicle. The electronic control circuits 10 have a second input 13 connected to a potentiometer 14 which is arranged to produce an electrical signal indicative of the throttle opening. The electronic control circuits 10 are also connected to a selector switch 16 which is controllable by a manually operable gear lever 17.

The electronic control circuits 10 have six outputs 20, 21, 22, 23, 24, 25, each of which is connected to the solenoid of a solenoid operated valve 27, 28, 29, 30, 31, 32. The solenoid operated valve 27 is arranged to control the fluid pressure in the fluid supply line to the friction elements of the gearbox. The arrangement is such that the solenoid operated valve 27 is opened at throttle openings above a predetermined opening and an increased fluid pressure is applied to the friction elements. This operation can be overridden by a switching circuit in the electronic control circuits 10, the switching circuit being actuated to prevent opening of the solenoid operated valve 27 when the speed of the vehicle is above a predetermined speed. This arrangement is provided because as will be explained later, it has been found that an increased fluid pressure at throttle openings above a selected opening is required only at low vehicle speeds.

The solenoid operated valve 28 when opened allows fluid pressure to be applied to engage the forward clutch; the solenoid operated valve 29 when opened allows fluid pressure to be applied to engage the reverse brake band; the solenoid operated valve 30 when open allows engagement of the second gear brake band; the solenoid operated valve 31 when opened allows engagement of the third gear brake band; and the solenoid operated valve 32 when opened allows engagement of the top and reverse clutch.

The gearbox can operated in an automatic mode or gears can be selected manually by use of the gear lever 17. In the automatic mode the electronic control circuits 10 generate an output signal in response to the signals it receives at the inputs 11 and 13. Selected friction elements are operated so that a gear is engaged which is appropriate to the vehicle speed and throttle opening. The electronic control circuits 10 include a number of signal generating circuits each responsive to the signal at the input 11 to generate a signal the magnitude of which is indicative of the vehicle speed. The number of signal generating circuits is such that a generating circuit is associated with each forward gear change provided by the gearbox.

To select gears manually the gear lever 17 is moved to the position corresponding to the selected gear. The electronic control circuits 10 are so arranged that operation of the friction elements associated with the gear or gears higher than the selected gear is not carried out until vehicle speeds at least equal to the vehicle speeds at which the friction elements are operated at full throttle opening in the automatic mode of operation. Operation of the friction elements associated with gears lower than the selected gear is carried out according to the normal automatic mode of operation.

Referring now to FIG. 2 of the drawings the electronic control circuits 10 have a terminal 110 corresponding to the input 11 (FIG. 1) which is connected to the inductive speed pick-up which is located on the output of the gearbox. The inductive speed pick-up is arranged to produce a signal the frequency of which is indicative of the velocity of the vehicle. The terminal 110 is connected by serially connected capacitor 111 and resistor 112 to the base of a transistor 113. The collector of the transistor 113 is connected to the base of a transistor 114. The emitter of the transistor 114 is connected to the base of the transistor 113. The transistors 113 and 114 constitute a shaping circuit which is responsive to the signals fed to the terminal 110 to produce square output signals.

The output of the shaping circuit is connected by a resistor 115 to the base of a transistor 116. The collector of the transistor 116 is connected to the base of transistor 117. The transistors 116 and 117 each constitute an amplifier. The transistors 116, 117 are arranged to amplify the output of the shaping circuit and to limit the output signal at the collector of the transistor 116 to a value slightly less than the supply voltage V.

The collector of transistor 117 is connected by a resistor 118 to four signal generating circuits each comprising a transistor pump circuit indicated generally at 120, 121, 122, 123. Each transistor pump circuit comprises a capacitor 125, 126, 127, 128, connected to the resistor 118, a transistor 130, 131, 132, 133 and and a diode 134, 135, 136, 137 connected between the emitter of the transistor 130, 131, 132, 133 and supply line $+V$. The collector of each of the transistors 130, 131, 132 is connected to a voltage divider comprising resistors 138, 139, 140, 141, 142, 143, 144, 145, 146, and the collector of the transistor 133 is connected to supply line $+V$.

Each transistor pump circuit 120, 121, 122, 123 is arranged to produce an output signal which is a voltage proportional to the frequency of the signal fed to the input of the pump circuit. Thus each of transistor pump circuits 120, 121, 122, 123 produces a voltage which is proportional to the speed of the vehicle.

Each of the resistors 139, 142, 145, is connected to the emitter of an emitter follower transistor 150, 151, 152. The collector of each of the transistors 150, 151, 152 is connected to each line E and the base thereof is connected by resistor 153, 154, 155 to terminal 156. The terminal 156 is connected to the wiper of the potentiometer 14 (FIG. 1). The wiper of the potentiometer is arranged to move in accordance with the rotation of the throttle spindle of the vehicle, the arrangement being such that a signal indicative of the degree of throttle opening is applied to the base of each of the transistors 150, 151, 152. The signal at the wiper of the potentiometer is a maximum at minimum throttle opening and minimum at full throttle opening.

The base of the transistors 150, 151, 152 is connected by a diode 157, 158, 159 to a line 161, 162, 163. Each of the emitter follower transistors 150, 151, 152 is arranged so that the maximum value of the signal at the base thereof is limited. This arrangement is provided to prevent unwanted gear changes at low throttle openings.

The signal at the emitter of each of transistors 150, 151, 152, is applied to each of the voltage dividers and added to the output of each of the transistor pump circuits 120, 121, 122. Thus a signal which is indicative of the vehicle speed and the throttle opening is produced on each of the lines 165, 166, 167. Each of the lines 165, 166, 167 is connected to a respective one of the lines 161, 162, 163 by a diode 168, 168', 168" and a resistor 169, 169', 169".

Each of the lines 165, 166, 167 is also connected to an amplifier trigger circuit 170, 171, 172 for a purpose to be described later. Each amplifier trigger circuit includes a pair of transistors 173, 174, 175, 176, 177, 178, the emitter of each pair of transistors being connected by a resistor 181, 182, 183, to earth line E. The collector of each of the transistors 173, 175, 177 is connected by a resistor 185, 186, 187 to supply line V and the collector of each of transistors 174, 176, 178 is connected by resistors 188, 189, 190 to supply line V. Each amplifier trigger circuit includes a decoupling capacitor 191, 192, 193 connected between the base of each of the transistors 174, 176, 178 and the lines 165, 166, 167. Each amplifier trigger circuit has two states and is arranged to change states at a first predetermined value of the signal applied to the base of each of the transistors 173, 175, 177 when the signal is increasing and at a second predetermined value of the signal when the signal is decreasing i.e., each amplifier trigger circuit has input voltage hysteresis. The first predetermined value is greater than the second predetermined value. It should be noted that the predetermined values of the signals at which each of the trigger circuits 170, 171, 172 change state are the same but because the values of the components in the transistor pump circuits 120, 121, 122 are different, each of the predetermined values are indicative of different vehicle speeds and throttle openings. The trigger circuit 170 is arranged to change state when a change from first gear to second gear (or vice versa) is required; the trigger circuit 171 is arranged to change state when a change from second gear to third gear is required; and the trigger circuit 172 is arranged to change state when a change from third gear to fourth gear is required.

The predetermined value at which each of the trigger circuits 170, 171, 172 changes state varies with variations in the supply voltage but since the magnitude of the signal indicative of the vehicle speed and throttle opening also varies with variations in supply voltage, such variations cancel out.

The collector of transistor 173 is connected by a resistor 195 to the base of transistor 196 and the collector of transistor 174 is connected by a resistor 197 to the base of a transistor 198. Each of the transistors 196, 198 constitute an inverter amplifier. The transistors 196, 198 are arranged such that when the signal applied to the base of transistor 173 is less than the first predetermined value, transistor 196 is non-conductive and transistor 198 is conductive. When the signal at the base of transistor 173 increases to the first predetermined value to switch the trigger amplifier 170 transistor 196 becomes conductive and transistor 198 becomes non-conductive. The collector of transistor 196 is connected to a first output stage 199. The signal at the collector of the transistor 196 is fed to the junction of two resistors 200, 201 which are connected between the base of a transistor 202 and earth line E. The emitter of the transistor 202 is connected to the emitter of an emitter follower transistor 203 which is provided to stabilize the supply voltage. The collector of the transistor 202 is connected by a resistor 204 to the base of a transistor 205. The transistors 203 and 205 constitute a two stage amplifier having positive feedback. The amplifier has two stable states in one of which the transistor 205 is non-conductive and in the other of which the transistor 205 is conductive. When the transistor 205 is conductive current is supplied to energise the solenoid of the solenoid valve associated with the reverse brake band such that fluid can be applied under pressure to actuate the reverse brake band. Transistor 205 is conductive when the transistor 196 is non-conductive and vice versa.

The collector of the transistor 198 is connected via a summing junction 210 to a second output circuit 211 which is identical to the first output circuit 199. The second output circuit has an output transistor 212 and is arranged to control energisation of the solenoid of the solenoid valve associated with the second brake band.

When the vehicle is being driven in first gear none of the brake bands are engaged. In this condition the transistor 196 is non-conductive and thus normally the transistor 205 will be conductive and the reverse brake band engaged but as will be explained later, the transistor 205 is biassed so that it is non-conductive when the vehicle is in first gear. When the signal indicative of vehicle speed and throttle opening increases to the first predetermined value the amplifier trigger circuit 170 switches, the transistor 196 becomes conductive and the transistor 198 becomes non-conductive. The potential at the junction 210 falls and the transistor 212 of output circuit 211 becomes conductive to energise the solenoid associated with the second brake band. Thus the second brake band is engaged for second gear.

The collector of the transistor 175 of the trigger circuit 171 is connected by a diode 215 to a Miller integrator 216 which comprises transistors 217, 218. The transistor 218 is connected by a capacitor 219 to the base of the transistor 217. The capacitor 219 is connected to earth line E by a resistor 214.

The collector of the transistor 176 is connected by a diode 202 to a Miller integrator 221 comprising transistors 222, 223. The collector of the transistor 223 is connected by a capacitor 224 to the base of the transistor 222. The capacitor 224 is connected to earth line E by a resistor 225. The Miller integrators 216, 221 are arranged to respond to the switching of the amplifier trigger circuit 171. When the signal fed to the base of transistor 175 increases to the first predetermined value the trigger circuit 171 switches and the transistor 218 which was non-conductive becomes conductive whilst the transistor 223 which was conductive becomes non-conductive. The capacitor 219 discharges relatively slowly through the resistor 214 whilst the capacitor 224 charges rapidly through the diode 220. The arrangement provides an overlap between operation of successive brake bands at gear changes as will be explained.

The collector of the transistor 218 is connected to the summing junction 210 and thus the signal at the collector of the transistor 218 is combined with the signal at the collector of the transistor 198 and fed to the second summing circuit 211. When the transistor 218 becomes conductive the potential at the junction 210 rises slowly as the capacitor 219 discharges through the resistor 214.

The collector of the transistor 223 is connected to a summing junction 230 which in turn is connected to a third output circuit 231 which is identical to the first and second output circuits 199, 211. The third output circuit has an output transistor 229 and is arranged to control energisation of the solenoid of the solenoid valve associated with the third brake band.

When the vehicle is in second gear the output transistor 212 of the output circuit 211 is conductive and the second brake band is engaged. None of the other brake bands are engaged. When the signal indicative of vehicle speed and throttle opening increases sufficiently to switch the amplifier trigger circuit 171 the transistor 218 becomes conductive and the transistor 223 non-conductive. The potential at the junction 130 falls rapidly and the transistor 229 becomes conductive. The solenoid of the solenoid valve associated with the third brake band is energised and thus the third brake band is engaged. At the same time the potential at the junction 210 begins to rise as the capacitor 219 discharges through the resistor 214. After a given time determined by the time constant of the resistor 214 and the capacitor 219 the potential at the junction 210 rises sufficiently to cause the transistor 212 to become non-conductive thereby releasing the second brake band. Thus it will be seen that at a change from second gear to third gear the third brake is engaged substantially at once and the release of the second brake band is delayed. This arrangement provides a smoother gear change.

The collector of each of the transistors 177, 178 is connected to a Miller integrator 232, 233. The Miller integrator 232 comprises a pair of transistors 235, 236, a capacitor 237 and a resistor 237', the Miller integrator 233 comprises a pair of transistors 238, 239, a capacitor 240 and a resistor 241. The Miller integrators 232 and 233 operate in a manner similar to that described for Miller integrators 216 and 221.

The collector of the transistor 236 is connected to the summing junction 230 and thus the signal at the collector of the transistor 236 is combined with the signal at the collector of the transistor 223 and fed to the third output circuit 231.

The collector of the transistor 239 is connected to a fourth output circuit 242. The fourth output circuit has an output transistor 243 and is arranged to control energisation of the solenoid of the solenoid valve associated with the top and reverse clutch.

When the vehicle is in third gear the output of transistor 229 is conductive and the third brake band is engaged. None of the other brake bands are engaged. When the signal indicative of vehicle speed and throttle opening increases sufficiently to switch the amplifier trigger circuit 172 the transistor 236 becomes conductive and the transistor 239 becomes non-conductive. The potential at the input to the output circuit 142 falls rapidly and the transistor 143 becomes conductive. The solenoid of the solenoid valve associated with the top and reverse clutch is energised and thus the top and reverse clutch is engaged. At the same time the potential at the junction 230 begins to rise as the capacitor 237 begins to charge through the resistor 237'. After a given time determined by the time constant of the resistor 237' and capacitor 237 the potential at the junction 230 rises sufficiently to cause transistor 229 to become non-conductive thereby releasing the third brake band. Thus it will be seen that at a change from third gear to fourth gear the top and reverse clutch is engaged substantially at once and the release of the third brake band is delayed.

The output of the transistor pump 123 is connected to a switching circuit 250 which comprises transistors 251, 252. The switching circuit 250 is arranged to switch when the voltage at the output of the transistor pump 123 reaches a predetermined value. When the voltage increases to the predetermined value the transistor 252 which was non-conductive becomes conductive.

The collector of transistor 252 is connected by a diode 253 to a junction 254. The junction 254 is connected to the terminal 156 by a resistor 255. The junction 254 is also connected to a fifth output circuit 256 which is similar to the first, second, third and fourth output circuits 199, 211, 231, 242. The fifth output circuit 256 has an output transistor 257 and is arranged to control energisation of the solenoid of a pressure modulation solenoid valve which is connected in the fluid supply lines of the brake bands and clutches of the gearbox. The pressure modulation valve is arranged such that the increased fluid pressure can be applied to the brake bands and clutches at throttle openings above a selected opening.

When the voltage at the wiper of the throttle potentiometer is above a predetermined value (i.e., the throttle opening is below the selected opening which in this case is 25% of full throttle opening) the output transistor 257 of output circuit 256 is non-conductive and the pressure modulation valve is not energised. When the voltage falls to said predetermined value the output transistor 257 of the output circuit 256 becomes conductive and the pressure modulation valve is energised to allow an increased fluid pressure to be applied to the brake bands and clutches. This operation can be overriden by the switching circuit 250. When the transistor 252 becomes conductive the potential at the junction 254 rises and the output transistor 257 of the output circuit 256 becomes non-conductive. Thus the pressure modulation valve is de-energised and the fluid pressure is reduced. This arrangement is provided because it has been found that an increased fluid pressure at throttle openings above a selected opening is required only at low vehicle speeds (in this case at vehicle speeds below 35 m.p.h.). The reason for this is that at low vehicle speeds the torque converter of the gearbox operates in a torque multiplying mode but above a given vehicle speed in each gear it operates as a fluid coupling. This, together with the decrease in engine torque at high engine speeds, means that the increased pressure is required only at low vehicle speeds. In fact an increased pressure can be a disadvantage at high vehicle speeds because it can lead to jerky gear charges.

The electronic control circuit includes a manually operable selector switch 300. The selector switch 300 is in the form of a three wafer switch and has seven positions. The three wafers are indicated at 301, 302, and 303 and the seven positions of the switch are shown as P, R, N, D, 3, 2, 1. The selector switch is movable by the driver of the vehicle to any one of the seven positions. P is the PARK position, R is the position for REVERSE, N is NEUTRAL, D is for DRIVE, i.e., normal automatic operation, 3 is the position selected when the driver wishes to hold the vehicle in third gear, 2 is the position selected for holding second gear, and 1 the position selected for holding first gear.

The P, R, N, positions of the wafer 301 are connected to the base of the transistor 116. When the selector switch is in any of these three positions the speed signal is inhibited. The D position is connected to the base of the transistor 205. In this position the base of the transistor 205 is short-circuited so that the reverse brake band is not engaged in first gear. The 3 and 1 positions are connected across diodes 310, 311 which are connected in series with the lines 161, 163. The 2 position is connected to the junction of diodes 310, 311 which junction is connected to the line 162. The diodes 310, 311 are connected in parallel with a diode 312.

If the selector switch is moved to the position 3 the base of the transistor 152 is connected directly to the earth line via diode 159. Thus the signal at the emitter of the transistor 152 is indicative of a fully open throttle. Furthermore, a conductive path is provided from line 167 via the resistor 169" and the diode 168" thereby reducing the voltage applied to the input of amplifier trigger circuit 172. Thus it will be seen that the amplifier trigger circuit 172 does not switch until the speed of vehicle is considerably higher than that at which a change from third gear to fourth gear normally takes place during automatic operation. It should be noted that it is not possible to hold third gear indefinitely since at a sufficiently high vehicle speed the output from the transistor pump 122 will be sufficiently great to switch the amplifier trigger circuit 172. The diodes 310, 311 prevent the transistors 151, and 150 being affected so that when position 3 is selected the first to second and second to third gear changes take place in the same manner as in automatic operation.

If the selector switch is moved to position 2 the base of the transistor 152 and the base of the transistor 151 are connected to earth line E. Thus the seond to third and third to fourth gear change take place as the vehicle speeds which are higher than in normal automatic operation but the first to second gear change takes place as normal because diode 310 prevents the transistor 150 being affected.

If the selector switch is moved to position 1 the base of transistors 150, 151 and 152 are connected to earth line E and thus all forward gear changes take place at speeds which are higher than in normal automatic operation. Furthermore the reverse brake band is engaged to provide engine braking in first gear.

The R position of the wafer 302 is connected to the output circuit 242. This connection ensures that when reverse gear is selected the top and reverse clutch is engaged. The P, N, D, 3, 2, positions of the wafer 302 are connected to the input of the first output circuit 199. When the selector switch 300 is in any of the P, N, D, 3, or 2 positions a voltage signal is applied to the input of the first output circuit 199 such that the transistor 205 is non-conductive. Thus the reverse brake band is not engaged. It will be noted that the D connection on wafer 302 has the same effect as the D connection on wafer 301 so that only one of these connections is necessary.

The P and N positions of the wafer 303 are connected to a terminal 305. When the selector switch is moved to either of the P, N positions a relay in the engine starting circuit is earthed. This arrangement ensures that the engine can be started only when the selector switch is in one of the P or N positions.

The R position of wafer 303 is connected to a terminal 306. The terminal 306 is connected to the circuit of a reversing lamp or lamps mounted on the vehicle. When the selector switch is in the R position the reversing lamp is illuminated.

The D, 2, 3, 1 positions of the wafer 303 are connected by line 307 to a terminal 308. The terminal 308 is connected to the solenoid of a solenoid valve associated with the forward clutch. The solenoid valve is energised and the forward clutch engaged whenever the selector switch is in any one of the D, 2, 3 or 1 positions.

It will be apparent that a transistor pump circuit 120, 121 and 122 is associated with each gear change provided by the gearbox. This arrangement has the advantage that each circuit can generate a full output signal corresponding to the maximum speed in the respective one of first, second or third gears. This gives a much more precise control of gear change points than when only a single vehicle speed generating circuit is provided for all change points. In the latter case a change from first to second gear at a low throttle opening takes place when the signal indicative of vehicle speed is at a low level.

I claim:

1. An automatic gearbox comprising a planetary gear system which provides at least three forward gear ratios, fluid pressure operated friction elements operatively connected thereto to change the gear ratios thereof, means for generating an electrical signal indicative of vehicle speed, means for generating an electrical signal indicative of throttle opening, electronic control circuits responsive to said signal means indicative of vehicle speed and throttle opening to control fluid pressure operation of said friction elements by means of solenoid valves so a gear is engaged which is appropriate to the vehicle speed and throttle opening, said electronic control circuits including means for combining said signal means indicative of vehicle speed and said signal means indicative of throttle opening, and a plurality of bistable state switching circuits each operatively connected with a forward gear change and each arranged to switch states when said combined signal is at a predetermined value, a manually operable switch for establishing connections for providing manual overriding signals to said electronic control circuits for the manual selection of forward gears, and at least one diode operatively connected between said throttle signal generating means and said switch and operatively connected when a gear is selected by operation of said manually operable switch, said diode provides a short-circuit connection to simulate for at least said selected and higher gears at least a full throttle opening condition, whereby the operation of the friction elements operatively connected with said selected gear and higher gears than said selected gear is not carried out until vehicle speeds at least equal to the vehicle speeds at which the friction elements are operated at full throttle opening under automatic control, wherein said selector switch has a fixed contact operatively connected with each forward gear ratio and a movable contact which can be moved into contact with any one of the fixed contacts, a diode is connected across successive pairs of fixed contacts whereby when the movable contact is moved into contact with one of said fixed contacts the diode or diodes connected to that and contacts operatively connected with higher gear ratios are forward-biased to provide said short circuit connection and the diode or diodes connected to contacts operatively connected with lower gear ratios are reverse biased.

* * * * *